Dec. 1, 1936.  E. J. WILSON  2,062,385

PROPELLING MECHANISM FOR TRUCKS

Filed April 12, 1934  4 Sheets-Sheet 1

INVENTOR.
Emery J. Wilson.
BY
Slough + Canfield
ATTORNEYS.

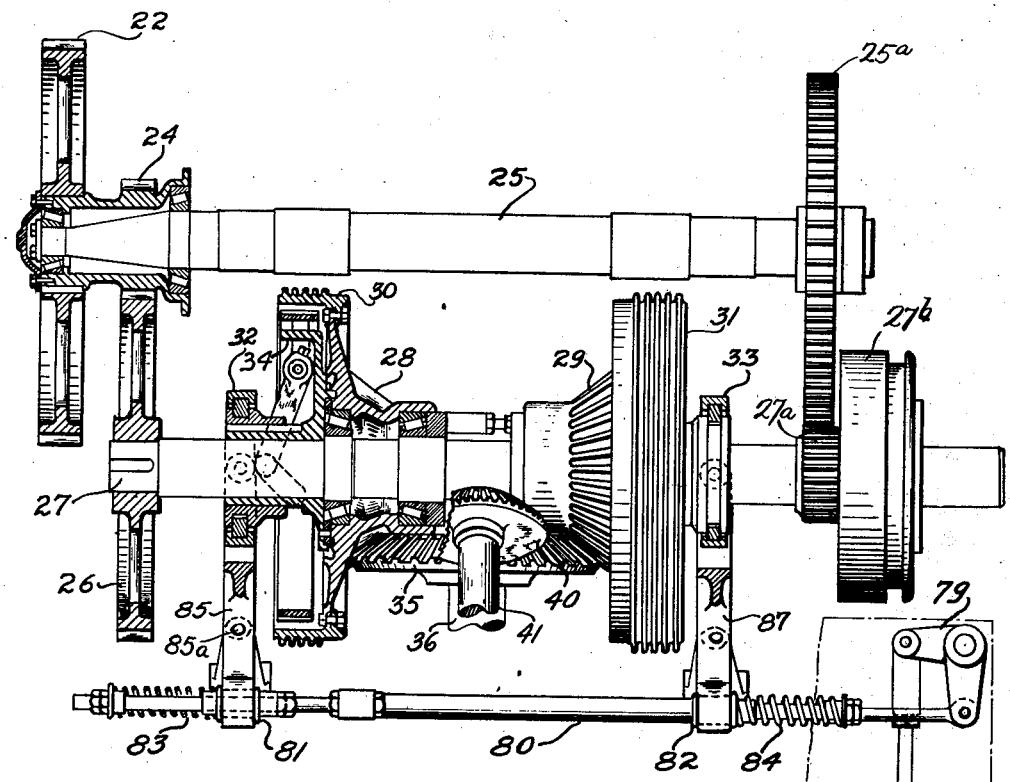
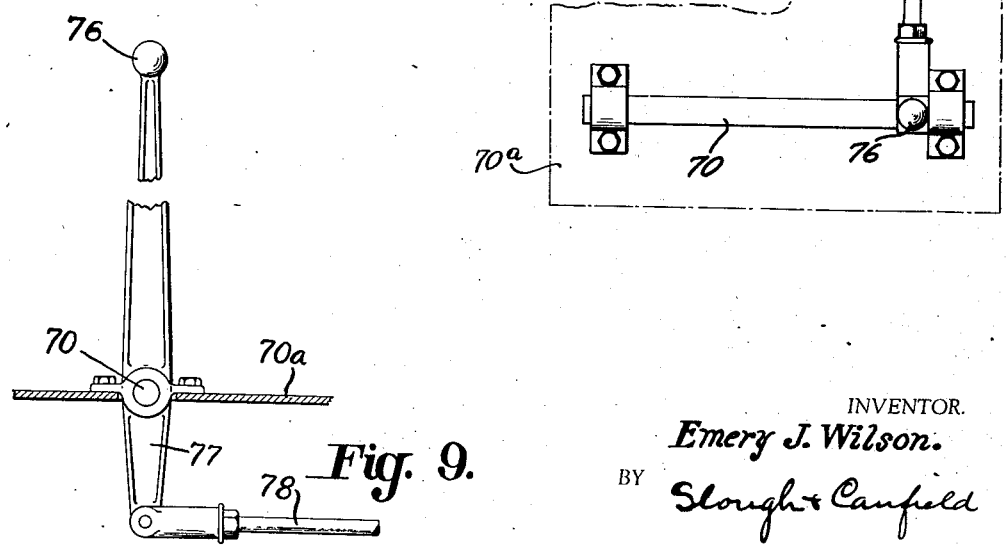
Fig. 2.
Fig. 9.
INVENTOR.
Emery J. Wilson.

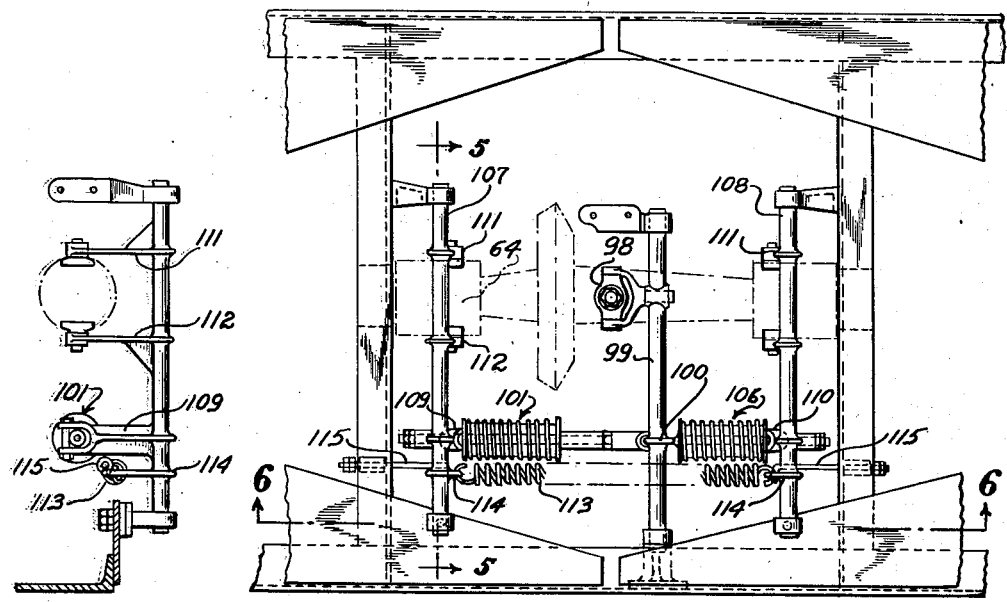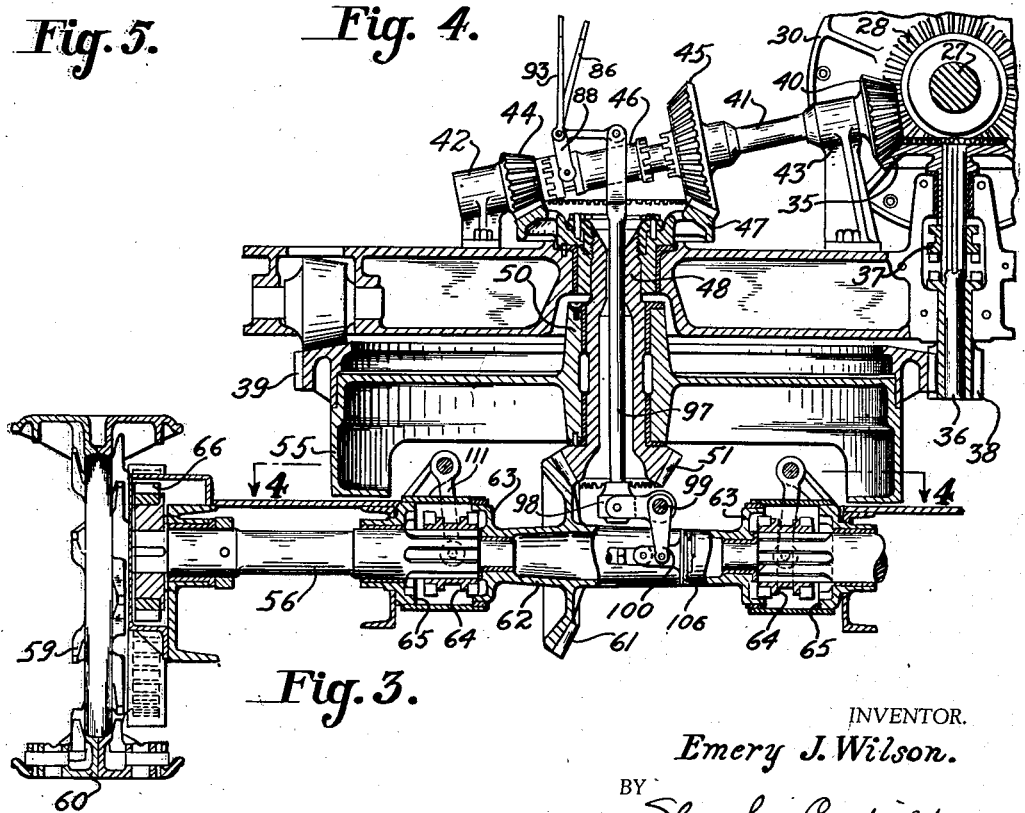

Dec. 1, 1936.　　　　E. J. WILSON　　　　2,062,385
PROPELLING MECHANISM FOR TRUCKS
Filed April 12, 1934　　　4 Sheets-Sheet 4
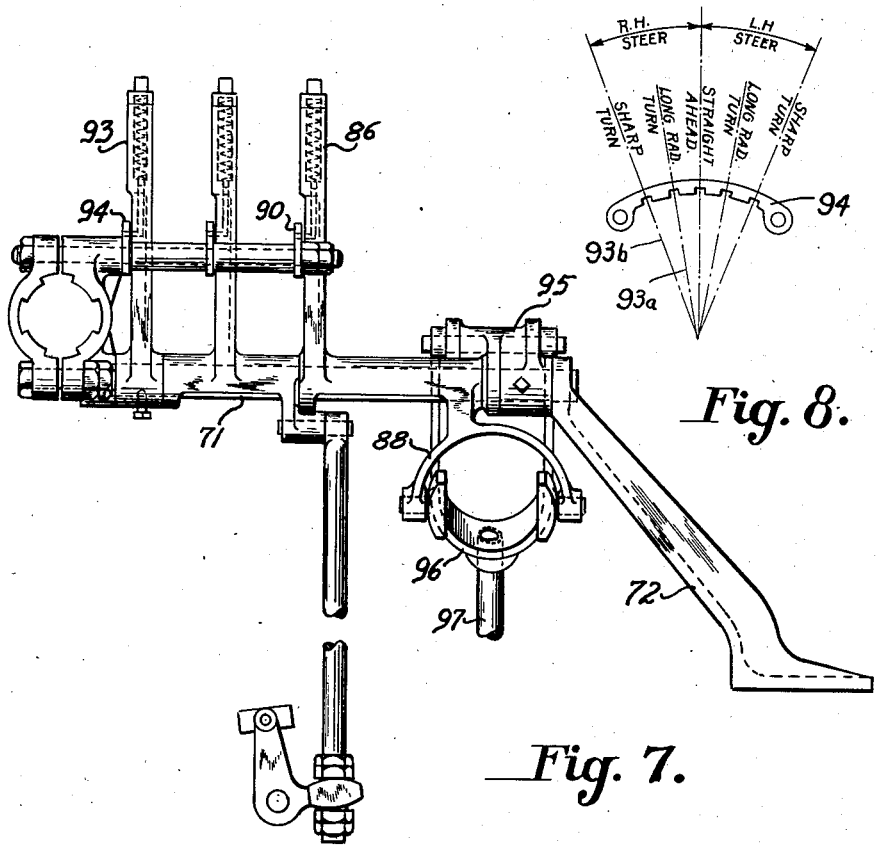
Fig. 8.
Fig. 7.
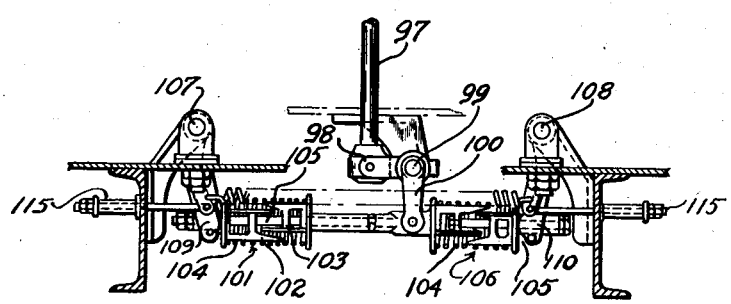
Fig. 6.
INVENTOR.
Emery J. Wilson.
BY
Slough & Canfield
ATTORNEYS Patented Dec. 1, 1936

2,062,385

UNITED STATES PATENT OFFICE 2,062,385

PROPELLING MECHANISM FOR TRUCKS

Emery J. Wilson, Cleveland, Ohio, assignor to Thew Shovel Company, Lorain, Ohio, a corporation of Ohio Application April 12, 1934, Serial No. 720,278

10 Claims. (Cl. 180—9.2)

This invention relates to improvements in propelling mechanisms for trucks, and more particularly relates to travel mechanism for trucks of the endless tread or track laying and locomotive crane types supporting load handling and excavating superstructures.

Trucks of the track laying type or endless tread type, familiarly termed crawlers, are usually propelled from the power unit on the superstructure through the provision of suitable gearing and clutches whereby driving rollers engaging each of the endless treads may be uniformly driven to cause the truck to travel in a straight ahead or reverse direction, or may be selectively disengaged to cause turning of the truck.

I have provided an improved propelling mechanism for trucks of the above type whereby the truck may be driven in a straight ahead or reverse direction and at two different speeds.

It is an object of my invention, therefore, to provide an improved propelling mechanism for trucks of the above type.

Another object of my invention is to provide an improved propelling mechanism for trucks of the above type whereby the truck may be efficiently propelled at two different speeds from a constant speed power unit.

Another object of my invention is to provide an improved propelling mechanism for load handling and excavating machines mounted upon a truck and provided with a single source of power.

Another object of my invention is to provide an improved travel mechanism whereby power may be delivered to a truck drive shaft to cause it to rotate in either direction and at two different speeds from a power unit disposed on a superstructure rotatable upon the truck.

Another object of my invention is to provide in a load handling and excavating machine comprising a truck carrying a rotatable superstructure comprising boom control mechanism, hoist control mechanism, and dipper stick control mechanism, all operable from a single power unit, an improved travel mechanism operable from the power unit concurrently with or independently of the aforesaid mechanisms and at two different speeds.

Another object of my invention is to provide an improved propelling and steering mechanism for trucks of the power-steered type whereby the truck may be caused to turn on a relatively short or long radius and at two different speeds for each said radius turns.

Another object of my invention is to provide an improved propelling and steering mechanism for trucks whereby the truck may be caused to turn when traveling in a straight-ahead or reverse direction at two different speeds.

Another object of my invention is to provide an improved control mechanism for trucks of the power-steered type whereby the truck may be caused to turn in either direction from the direction of travel and on a relatively short or long radius turn through manipulation of a single lever.

These and other objects of the invention will become increasingly apparent from a consideration of the following description and drawings. wherein:

Fig. 2 is an enlarged fragmentary view of a portion of the power shaft mechanism taken on line 2—2 of Fig. 1;

Fig. 3 is a transverse vertical sectional view of the truck, taken along the lines 3—3 of Fig. 1, and of the superstructure rotated through 90° as illustrated in Fig. 1;

Fig. 4 is a plan view partially diagrammatic taken along line 4—4 of Fig. 3, illustrating the clutch actuating mechanism;

Fig. 5 is a transverse sectional view taken on line 5—5 of Fig. 4;

Fig. 6 is a fragmentary sectional view taken along line 6—6 of Fig. 4;

Fig. 7 is an elevational view of manual control levers which I may employ;

Fig. 8 is a view partially diagrammatic of a quadrant adapted to maintain one of the levers illustrated in Fig. 7 in a plurality of operative positions;

Fig. 9 is a fragmentary elevational view showing the method of mounting the manual control lever of Fig. 2.

Figure 1:
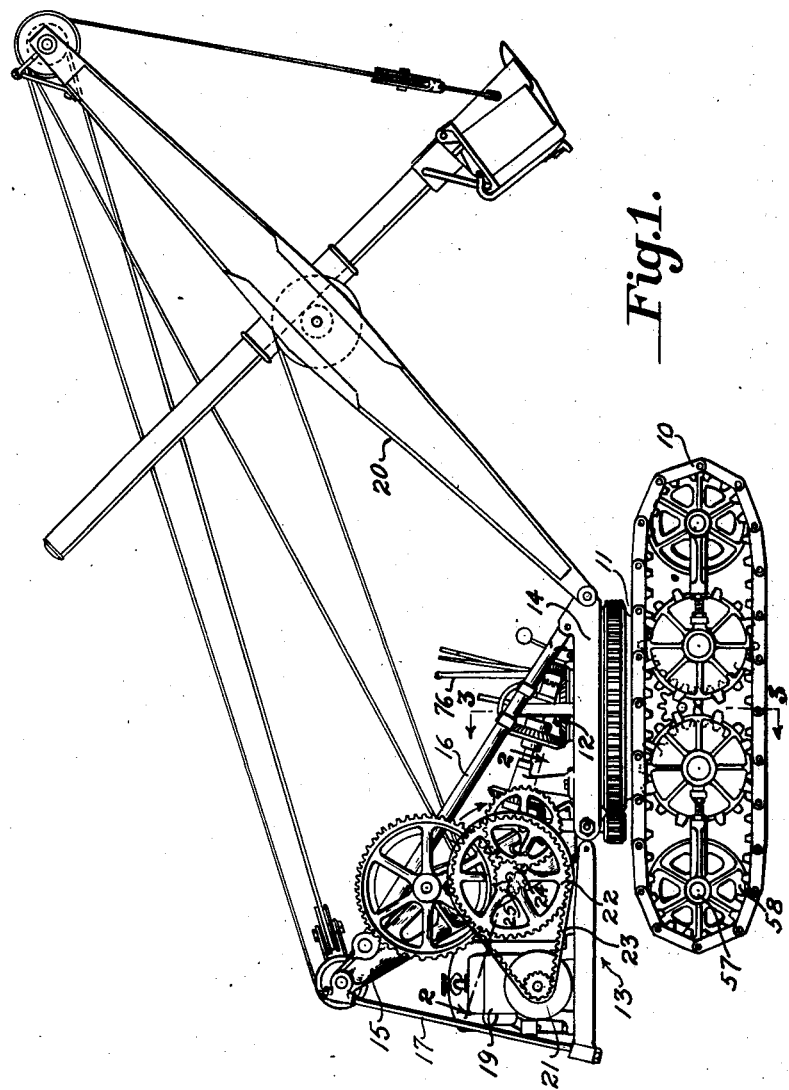
Fig. 1 is an elevational view of a power shovel embodying my invention, with some of the parts removed for simplicity of illustration.

Referring to the drawings, I have indicated the truck generally at 10, the superstructure rotatably supported upon the truck at 11, and the travel mechanism at 12. The superstructure comprises generally a frame 13 including a sectional turntable 14, rearwardly inclined posts 15 pin connected at their bases to the turntable and supportingly linked with the turntable at their upper ends by struts 16 and tie rods 17; power shafts supported by the posts, a power unit 19 supported rearwardly of the turntable and a boom 20 carried by the turntable. Although I have shown the superstructure as adapted to power shovel operations, it is understood that differing superstructures adapted to various functions may be utilized.

The power unit 19, illustrated as an internal combustion engine, drives a pinion 21 through suitable clutch means, the pinion 21 driving a gear 22 by means of a silent chain 23. The gear 22 together with a pinion 24 integral therewith is rotatably mounted on a center drive shaft 25 preferably by anti-friction bearings, the shaft 25 being fixedly mounted between the spaced posts 15. The pinion 24 meshes with a gear 26 keyed to a horizontal swing shaft 27, the swing shaft being rotatably mounted transversely of posts 15 by suitably bushed split bearings provided therein. The swing shaft 27 will thus be continuously rotated during operation of the motor and when the motor pinion clutch is engaged. The horizontal swing shaft 27 has rotatably mounted thereon adjustably spaced pinions 28 and 29, each of the pinions having integral therewith a clutch drum as indicated at 30 and 31 respectively.

The center drive shaft 25 has an idler gear 25a rotatably mounted thereon, the idler gear being adapted to be driven by the pinion 27a mounted on the swing shaft 27. The pinion 27a may be operably connected with the swing shaft 27 by means of a boom hoist clutch generally indicated at 27b to actuate the idler gear 25a.

The idler gear 25a meshes with a gear (not shown) integral with the boom hoist drum journalled on the turntable bed, the boom hoist drum carrying the usual cable leading to sheaves at the boom peak whereby the boom may be raised or lowered by rotation of the drum. A braking mechanism (not shown) is also associated with the boom hoist clutch to control lowering of the boom, but it is understood that the means controlling raising and lowering of the boom constitutes no essential part of my invention, and any suitable means may be employed.

Also mounted on the shaft 27 and splined therewith are grooved sleeves 32 and 33 each operably connected to an internally expanding type friction clutch 34—34 adapted to frictionally engage the inner face of clutch drums 30 and 31 by axial movement of the sleeves 32 and 33. The movement of the sleeves 32 and 33 is manually controlled in a manner to be later described, whereby the pinions 28 and 29 may be selectively coupled to and caused to rotate with the shaft 27.

The pinions 28 and 29 are each meshed with a bevel gear 35 coupled to a vertical swing shaft 36 rotatably supported by the frame 13. The horizontal swing shaft 27 continuously rotates in a clockwise direction as viewed in Fig. 1, and the pinions 28 and 29, being confrontingly mounted on the shaft 27, will cause the bevel gear 35 to be rotated in reverse directions about a vertical axis dependent on which pinion is selectively coupled to the shaft 27.

The bevel gear 35 performs the dual function of operating the vertical swing shaft 36 to swing the superstructure relative to the truck and of operating the travel mechanism in a manner to be described by the pinion 28 or 29. The shaft 36 by means of a jaw clutch 37 is rotatably coupled with a pinion 38 meshing with and having planetary action relative to a gear 39 fixed to the truck whereby the superstructure may be swung in either direction dependent upon the direction of rotation of the bevel gear 36 as effected by the pinion 28 or 29.

The bevel gear 35 also meshes with a bevel pinion 40 keyed to one end of an inclined travel shaft 41 rotatably mounted on the turntable by means of spaced bearings as indicated at 42 and 43. The direction of rotation of the travel shaft 41 will be determined by selectively coupling the pinion 28 or 29 with the horizontal swing shaft. Loosely mounted on the travel shaft 41 are spaced bevel pinions 44 and 45 each of said pinions being provided with clutch segments in confronting faces thereof, whereby they may be selectively coupled to the travel shaft by means of an intermediately disposed jaw clutch member 46 splined to the travel shaft. The jaw clutch member 46, adapted to be engaged or disengaged from the aforementioned pinions by movement axially on the travel shaft, is manually controlled through lever means to be described.

The travel shaft pinions 44 and 45 are each meshed with a vertically mounted bevel gear 47, the gear 47 being mounted on a center pin 48 about which the turntable and superstructure rotates. The gear 47 can be caused to rotate in either direction dependent upon the direction of rotation of the travel shaft 41, and at either of two different speeds dependent upon whether pinion 44 or pinion 45 is driving the gear. It will be apparent by reference to Fig. 3 that when the travel shaft 41 is rotating in a given direction, engagement of the gear 47 with the pinion 44 will cause the gear 47 to rotate in one direction, and engagement of the gear 47 with the pinion 45 will cause the gear 47 to rotate in a reverse direction, so that when it is desired to continue traveling in a given direction and at a different speed and when one of the pinions 44 or 45 is rendered inoperable to drive the gear 47 and the other is rendered operable, that the shaft 41 will be reversed in direction by the friction clutches 34 on the hoist-swing shaft. Thus, with the aforementioned clutch and gear train initiated at the motor, power is transmitted to the gear 47, the friction clutches 34 on the hoist-swing shaft 27 being selectively operable to determine the direction of rotation, and the jaw clutch on the travel shaft being selectively movable to determine the speed of rotation.

The aforementioned gear and clutch train affords a relatively direct, efficient, and compact means of transmitting power to the travel mechanism. This is effected independently of the boom control, hoist, dipper stick, or similar control operations and these operations, if desired, may be carried on concurrently with truck travel. Since the same bevel gear 35 controls the travel mechanism and the swing mechanism, the swing mechanism is normally disengaged during travel, there being no occasion for concurrently effecting travel and swing movements.

The center pin 48 upon which the bevel gear 47 is mounted is rotatably supported generally centrally of the truck body, in a hub 50 integral therewith, the lower end of the center pin having integrally formed therewith a bevel pinion 51 meshing with a gear 61 adapted to be coupled to the crawler drive shafts.

The truck body generally indicated at 55, and preferably formed of cast metal, is of rugged inverted box form construction and is rigidly connected by channel or the like frame members to fixed end axles 57, and intermediately disposed driving axles 56, the axles 57 forming a mounting for idling rollers 58. The rollers 59 are rotatably mounted relative to the frame 55 and are adapted to be driven by axles 56 in a manner to be later described. The rollers 58 and 59 are engageable with and rotate upon an endless tread 60 whereby the truck will be propelled in a manner well understood.

The bevel pinion 51 of the center drive pin 48 meshes with a bevel gear 61 integrally mounted upon a hollow shaft 62 rotatably mounted upon relatively reduced end bearing portions of the driving axles 56 projected into the shaft ends, the driving axles 56 being suitably mounted as previously described by frame members secured to the truck body. The shaft 62 at each end is provided with relatively enlarged outwardly disposed clutch faces 63 engageable with axially movable jaw clutch members 64—64 splined to the driving axles, whereby the driving axles may be independently or concurrently rotated by the gear 61. The jaw clutch members 64 are also adapted to be locked with clutch faces 65 secured to the truck frame members, whereby either driving axle may be selectively locked against rotative movement.

Normally, both driving axles will be coupled with the shaft 62 to propel the truck in a straight ahead position. When it is desired to turn the truck one of the driving axles will be disengaged, whereby one tread will be propelled and the other may be idly moved to effect a relatively long radius turn. To effect a short turn, the disengaged axle, rather than being permitted to idle, is locked to the truck frame by means of the clutch face 65 preventing movement of its associated tread. There are two center drive rollers 59 on each side of the truck, each being provided with an integral gearing portion meshed with an intermediate pinion 66. The rollers 59, as previously stated, are engageable with the endless tread 60 through interengaging tooth and sprocket portions. The pinions 66 are fixed to the outer ends of the axle 56 and are rotatable therewith, the axle 56, by means of the jaw clutch members 64—64 splined thereon, being adapted to be selectively engaged either with the clutch face 63 or the clutch face 65 which is fixed to the truck frame. Since the clutch face 65 is fixed to the truck frame, interengagement of the member 64 therewith will prevent the axle 56 and its associated pinion 66 from rotating, and consequently the gearing portion integral with the rollers 59 will be prevented from rotating, thereby maintaining the endless tread 60 in a fixed position relative to the truck frame.

Thus, when one of the endless treads 60 is maintained fixed by the coupling member 64 and the clutch face 65, and the opposite tread is driven through coupling clutch member 64 and the clutch face 63 of the shaft 62, the truck will be turned relatively more sharply than if the jaw clutch member 64 were in an intermediate position permitting the locked tread to rotate idly without being driven.

The various clutches so far described and whether of the friction or jaw clutch type are operable in a generally similar manner by movement of a grooved sleeve axially of the shaft on which its associated clutch is mounted, the sleeve movement being effected by manually operable levers and suitable link connections. These various lever mechanisms will now be described.

The various operating levers are mounted so as to be easily accessible to the operator, the levers controlling the swinging of the superstructure, derricking of the boom, and the drum hoist being preferably mounted on a common shaft 70 secured to a plate 70a supported laterally of the turntable as is also the lever controlling the engine clutch. The levers controlling the steering, travel, and a lever jointly controlling the swinging of the superstructure being mounted on a common shaft 71, the shaft 71 being spaced upwardly from the turntable by a bracket 72 and a collar engaging a strut 16. The levers controlling derricking of the boom, the hoist drum, and kindred operations, constitute no essential part of my present invention and can be of any suitable type well understood in the art.

The swing lever 76 which actuates the sleeves 32 and 33 axially of the horizontal swing shaft to selectively couple the pinions 28 and 29 therewith through friction clutches 34, is rotatably mounted on the shaft 70 and is provided with a depending arm 77. As best illustrated in Fig. 9, the arm 77 is linked by a connection 78 to one arm of a pivoted crank 79 supported by the plate 70a, the opposite arm of the crank being adapted to transmit movement horizontally and generally at right angles to the connection 78 to a rod 80. Thus, vertical rotative movement of the swing lever 76 about its shaft through the aforementioned link means will transmit horizontal movement transversely of the turntable to the rod 80.

Fixedly secured to the rod 80 at spaced points by means of an intermediately disposed spacing sleeve are fixed collars 81 and 82. Adjacent each of the fixed collars 81 and 82 are resiliently and axially movable cooperating centering springs 83 and 84. The collar 81 and spring 83 have disposed therebetween the forked lower end of an inclined yoke member 85 which partially encircles the rod 80. Substantially midway of the yoke member 85 it is provided with a pivotal support 85a secured to the turntable, the upper or yoke end being provided with pins directed inwardly towards and radially of the horizontal swing shaft 27. The yoke pins engage the sleeve 32 and effect axial movement of the sleeve to engage or disengage the pinion 28 from the shaft 27. Thus, upon movement of the fixed collar 81 outwardly relative to the turntable through the link means described, the pinion 28 will be coupled to the shaft. In like manner, a yoke member 87 controls the engagement and disengagement of the pinion 29 with the shaft 27 through actuation of the fixed collar 82.

Movement of the lever 76 upon either side of a neutral position will selectively couple the pinions 28 and 29 with the shaft 27 and upon release of the lever it will be returned to the neutral or disengaged position relative to both pinions, by means of the resiliently movable centering springs 83 and 84. Thus, to effect swinging of the superstructure or to propel the truck, the gear 35 will be caused to rotate in a desired direction by the above described lever means.

The lever means actuating the jaw clutch member 46 mounted on the travel shaft to selectively couple the bevel pinions 44 or 45 with the shaft will now be described. The hand operable control lever effecting this result is termed the travel lever, indicated at 86, rotatably mounted on the shaft 71 and provided with a laterally extending sleeve telescoped over the shaft. The sleeve has integral therewith a forked arm 88 extending radially from the shaft 71 and engageable by inwardly disposed pins at the fork ends with the jaw clutch element 46. Pivotal movement of the lever 86 about the shaft 71 in one direction will cause the jaw clutch element 46 to engage the pinion 44, thereby coupling the pinion to the travel shaft, whereby the truck may be propelled at a given speed; movement of the lever 86 in a reverse direction will couple the pinion 45 with the travel shaft to propel the truck at a different speed, and in an intermediate or neutral position of the lever 86 neither pinion will be coupled to the travel shaft. To maintain the lever in a desired position it is provided with a spring operable detent adapted to lock with a quadrant 90.

The swing lever 76 will, in a manner previously described, effect the direction of rotation of the travel shaft and the travel lever 86 will effect the speed at which the truck is propelled.

The manner of effecting steering of the truck will now be described. A steering lever 93 rotatably fixed to the shaft 71, upon which the travel lever 86 is also mounted, is adapted by means of a detent engageable with a quadrant 94 to be locked in a desired position in a manner similar to the lever 86. Movement of the lever 93 will rock the shaft 71 and a laterally extending crank 95 rigidly secured thereto, the crank 95 being pivotally connected intermediate the arms of a yoke member 96, whereby a vertical movement will be transmitted to the yoke 96 by rotative movement of the steering lever 93. The yoke 96 is adjustably secured to a rod 97 projected through and movable axially of the vertically disposed center pin 48, the lower end of the rod 97 being connected to a trunnion block 98 disposed laterally of and adapted to rock a shaft 99 rotatably mounted generally centrally and longitudinally of the truck. A depending arm 100, rigidly secured to the shaft 99 and bifurcated at its lower end, is pin connected to a centering mechanism 101. The mechanism 101 comprises elements 102 and 103, an encircling compression spring 104, and a rod 105. The elements 102 and 103 are generally similar and comprise a centrally perforated disc or flange provided with an arcuate arm extending at right angles to the discs. The elements are slidably mounted on the rod 105 with the arms rotated to permit overlapping axial movement, the disc portion of the element 103 abutting a sleeve or shoulder provided on the rod 105, the disc portion of the element 102 abutting a bifurcated arm 109 hereinafter described and partially encircling the outer end of the rod 105. Nuts provided on the outer end of the rod 105 are adjustable to regulate the compression spring 104. The spring 104 normally compressively engages the disc portions of elements 102 and 103, and may thus relatively alter the axial relation of elements of 102 and 103 as controlled by movement of the arm 100 hereinafter described. Linked by a clevis to mechanism 101 is a generally similar mechanism 106, both mechanisms thus being jointly operable through movement of the arm 100.

Mounted laterally of and parallel to the shaft 99 are similar shafts 107 and 108 adapted to be selectively rocked by transverse movement of the mechanisms 101 and 106, each shaft having a depending bifurcated arm, indicated at 109 and 110, respectively, abutting the outer mechanisms ends and engaging the mechanism adjustment rods as at 105 whereby they will be maintained in proper alignment. Also integral with each shaft are spaced depending arms 111 and 112 provided with pivoted blocks at their lower ends adapted to engage the jaw clutch members 64—64 mounted on the driving axles for the truck.

The driving rollers 59 are continuously coupled with the driving axle 56 through the integral gear ring thereon engaging the pinion 66 and normally the axles 56 are coupled with the shaft 62 by the clutch element 64 as illustrated in Fig. 3. The clutch elements are maintained in engaged position by means of a tension spring 113 interconnecting depending arms 114 integral with each of the shafts 107 and 108 whereby the arms 111 and 112 engaging the clutch elements 64 will be rocked and maintained toward each other. The shaft rock arms 114—114 are linked to the truck body by rods 115. The rods 115 may be moved and secured outwardly by nuts 115a to rock shafts 107 and 108 and hold clutches 64 out of engagement when towing the truck.

The object of springs 104 is to permit full movement of the hand lever 93 even when sliding jaw clutch 64 is prevented from movement either by being under its driving load or by its teeth not registering with jaw teeth 65 in fixed clutch. The operation simply throws lever 93 at any time and the clutches snap home when the jaw teeth register.

Effecting downward movement of the vertical rod 97 by means of the steering lever 93 will compress the spring 104 of the right-hand centering mechanism 106 as viewed in Fig. 6, and rock the shaft 108 outwardly causing the one clutch element 64 to become disengaged from its associated driving axle. Since one tread is being propelled by the driving rollers and the opposite tread driving rollers are permitted to rotate idly, the truck will be caused to turn on a relatively large radius. Increased downward movement of the vertical rod 97 will rock the shaft 108 farther outwardly to cause the disengaged clutch member 64 to lock with its associated clutch face 65 secured to the frame, and the disengaged driving rollers will be locked against rotative movement holding their engaging tread stationary and effecting a relatively sharp turn of the truck. Upon release of the steering lever 93, and return to normal position, the disengaged clutch element 64 will be moved to engaged driving position under the influence of the spring 113. Upward movement of the rod 97 from the position illustrated in Fig. 6 will cause the truck to be turned in a reverse direction in a similar manner.

It will be observed that the clutches transmitting the propelling power from the horizontal swing shaft are friction clutches, and that the jaw clutches effecting rotation of the travel shaft and truck driving axles are resiliently engageable, in order to permit the hand lever to be moved instantly to any position even though the clutch 64 may be restrained against movement by its jaw teeth not registering with the fixed clutch 65, or by being under its driving load.

As illustrated in Fig. 8, the hand lever 93 is adapted to be locked in five different positions whereby at a central position the truck will travel in a straight ahead position or may be caused to turn to the left or right on either a short radius turn or a long radius turn. The position of the hand lever determines the relative vertical position of the rod 97 and the relative compressive force exerted by springs 104. Thus, as illustrated in Fig. 3, both clutch elements 64 are operatively coupled with the shaft 62 and the truck will travel in a straight ahead direction.

Upon locking the hand lever 93 in position 93a, as illustrated in Fig. 8, the rod 97 will be lowered, compressing the spring 104 of mechanism 106 and urging the clutch element 64 to a disengaged position. If the frictional contact between the jaw clutch 63 and clutch element 64 is too great, due to the driving torque, to permit disengagement, the travel lever may be moved to momentarily decrease the torque. The truck will then turn on a long radius to the right and if a short radius turn is desired, upon locking the hand lever in the position 93b, the compressive force of the spring 104 will be increased urging the clutch element 64 to engagement with fixed jaw clutch 65 and upon proper registration of the clutch faces the right-hand driving axle as viewed in Fig. 3 will be locked against rotative movement, effecting a short radius turn to the right. Upward movement of the rod 97 will cause a reverse of these operations and beyond an intermediate point will effect steering to the left in a similar manner.

The springs 104 thus allow the hand lever to be locked to effect a desired movement of the truck and subsequently effect movement of the clutch upon a sufficient decrease of frictional contact between the engaged clutch faces if this is required and/or upon proper registration of cooperating clutch faces in the new position. The operator is thus permitted to use both hands for other purposes and the resilient movement of the clutch means occasions less shock than would occur in a positive acting clutch.

The above described steering and travel control mechanism permits steering and travel to be effected from any relatively rotated position of the superstructure.

Although I have shown and described a preferred embodiment of my invention, I contemplate that numerous and extensive departures may be made therefrom without departing from the spirit of my invention and the scope of the appended claims.

Having thus described my invention, what I claim is:—

1. In a vehicle of the class described, a power source, aligned propelling shafts, a vertically disposed shaft having a beveled gear integrally fixed to an end thereof and adapted to be coupled to the propelling shafts, a shaft inclined at an angle to the plane of the beveled gear and adapted to be driven by the power source, spaced beveled pinions each having a different number of teeth meshed with the beveled gear and rotatably mounted on the inclined shaft, and clutch means for selectively coupling the pinions to the inclined shaft whereby the coupled pinion will transmit the entire propelling power for the vehicle.

2. A vehicle of the class described, a source of power, aligned propelling shafts, a turntable, a vertical shaft mounted at the axis of rotation of the turntable and having a beveled gear integrally fixed to an end thereof projected upwardly through the turntable, a shaft disposed above the beveled gear and inclined relative to the plane of the beveled gear, means for selectively rotating the inclined shaft in reverse directions by the power source, spaced beveled pinions rotatably mounted on the inclined shaft meshing with the beveled gear, each of said pinions having a different number of teeth, means for selectively coupling the vertical shaft to the propelling shafts, and clutch means on the inclined shaft for selectively coupling the pinions to the inclined shaft whereby the coupled pinion will transmit the entire propelling power for the vehicle.

3. In a machine of the class described, a truck, aligned propelling shafts suspended from the truck, a turntable rotatably mounted on the truck, a source of power on the turntable, a vertical shaft having its axis lying in the axis of rotation of the turntable and provided with a beveled gear fixed to an end of the shaft projected above the turntable, a shaft inclined relative to the plane of rotation of the beveled gear and adapted to be reversibly driven by the source of power, spaced beveled pinions rotatably mounted on the inclined shaft meshing with the beveled gear and adapted to be selectively coupled to the said inclined shaft whereby the coupled pinion will transmit the entire propelling power for the vehicle, and a manually operable means on the turntable whereby the vertical shaft may be selectively coupled with the aligned propelling shafts.

4. In a vehicle of the class described, a power unit, propelling shafts, transmission mechanism extending from said power unit to a shaft rotatable in opposite directions, clutch means for selectively controlling the direction of rotation of said shaft, a second shaft operably connected to said first shaft, speed change gears loosely mounted on the second shaft, clutch means for selectively coupling the speed change gears with the second shaft, means operably connecting the second shaft with the propelling shafts, and manually actuable means effecting movement of the clutch means.

5. The vehicle as described in claim 4, and wherein clutch means are provided to independently selectively couple the propelling shafts with the second shaft or to lock the propelling shafts against rotative movement.

6. In a vehicle of the class described, including a base and a superstructure rotatably mounted thereon, a pair of aligned propelling shafts disposed beneath the base, a power unit, transmission mechanism supported on the superstructure comprising a shaft driven by the power unit, spaced pinions rotatably mounted on the driven shaft, a gear rotatably mounted on the superstructure engaging each of the pinions, manual means for selectively coupling the pinions to the driven shaft to reversibly rotate the gear, a second shaft driven by the gear including spaced pinions rotatable on the shaft and clutch means for selectively coupling either of said pinions to the shaft, and means projected through the base at its axis of rotation coupling said last named pinions with the propelling shafts.

7. In a vehicle of the class described having a platform travel means supporting said platform and a transmission mechanism for communicating driving power from said motor to said traveling means comprising a ring gear and a pair of bevel pinions, said ring gear when rotated communicating driving motion to said traveling means, said bevel pinions adapted to be separately actuated by said motor to drive said ring gear, drive shaft means for said pinions, said pinions being of substantially differing diametrical sizes with corresponding substantially different numbers of teeth thereon, said drive shaft means supporting said pinions and communicating driving movement from the motor through a selected one of said pinions to said ring gear, said pinions being inclined relative to the rotational axis of said ring gear.

8. In a vehicle of the class described having a platform travel means supporting said platform and a transmission mechanism for communicating driving power from said motor to said traveling means comprising a ring gear and a pair of bevel pinions, said ring gear when rotated communicating driving motion to said traveling means, said bevel pinions adapted to be separately actuated by said motor to drive said ring gear, drive shaft means for said pinions, said pinions being of substantially differing diametrical sizes with corresponding substantially different numbers of teeth thereon, said drive shaft means supporting said pinions and communicating driving movement from the motor through a selected one of said pinions to said ring gear, said pinions being inclined relative to the rotational axis of said ring gear, and said drive shaft means being inclined to the plane of said ring gear.

9. In a vehicle of the class described, a motor, a rotatable platform, traction elements supporting the platform, transmission mechanism for communicating driving power from the motor to the traction elements, said transmission mechanism comprising a ring gear and a pair of beveled pinions, said ring gear when rotated communicating driving motion to said traction means, said beveled pinions adapted to be separately actuated by the motor to drive the ring gear, a drive shaft supporting said pinions and communicating driving movement from the motor to a selected one of said pinions and said ring gear, and common means adapted to reversibly communicate driving power from the motor to said drive shaft, and to optionally and concurrently effect rotation of the platform.

10. In a vehicle of the class described, a motor, a rotatable platform, traction elements supporting the platform, transmission mechanism for communicating driving power from the motor to the traction elements, said transmission mechanism comprising a ring gear and a pair of beveled pinions, said ring gear when rotated communicating driving motion to said traction elements, said beveled pinions adapted to be separately actuated by the motor to drive the ring gear, a drive shaft supporting said pinions and communicating driving movement from the motor to a selected one of said pinions and said ring gear, and said transmission mechanism including a shaft adapted to effect rotation of the platform, common gear means adapted to effect rotation of said drive shaft and platform actuating shaft, and clutch means interconnecting said common gear means and the platform actuating shaft operable independently of driving movement of the ring gear.

EMERY J. WILSON.